(No Model.)  6 Sheets—Sheet 1.
E. J. WATSON.
MACHINE FOR MAKING PUMP CHAINS.
No. 280,422.  Patented July 3, 1883.
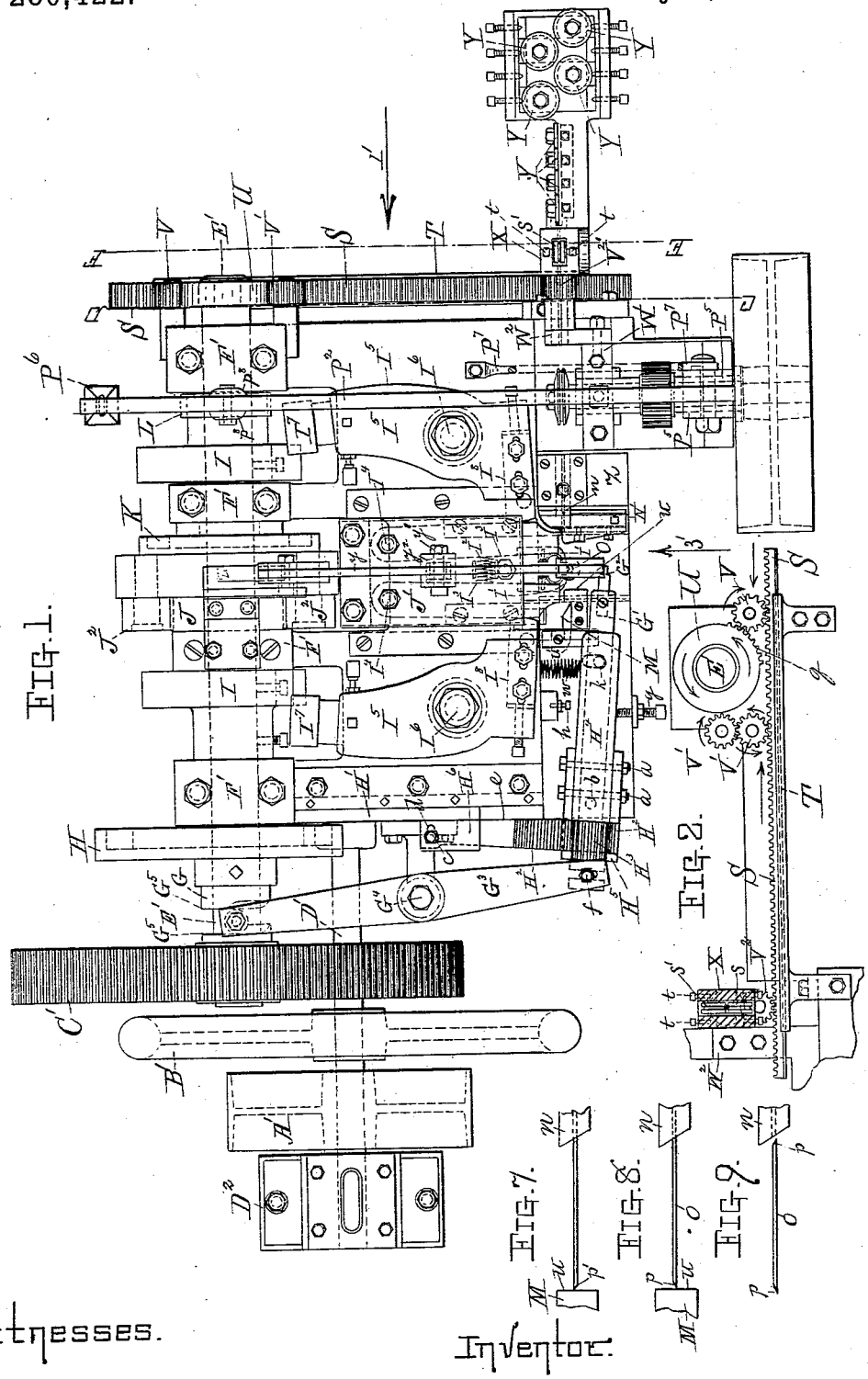
Witnesses.
Thos. H. Dodge.
John C. Dewey.
Inventor:
Edwin J. Watson.

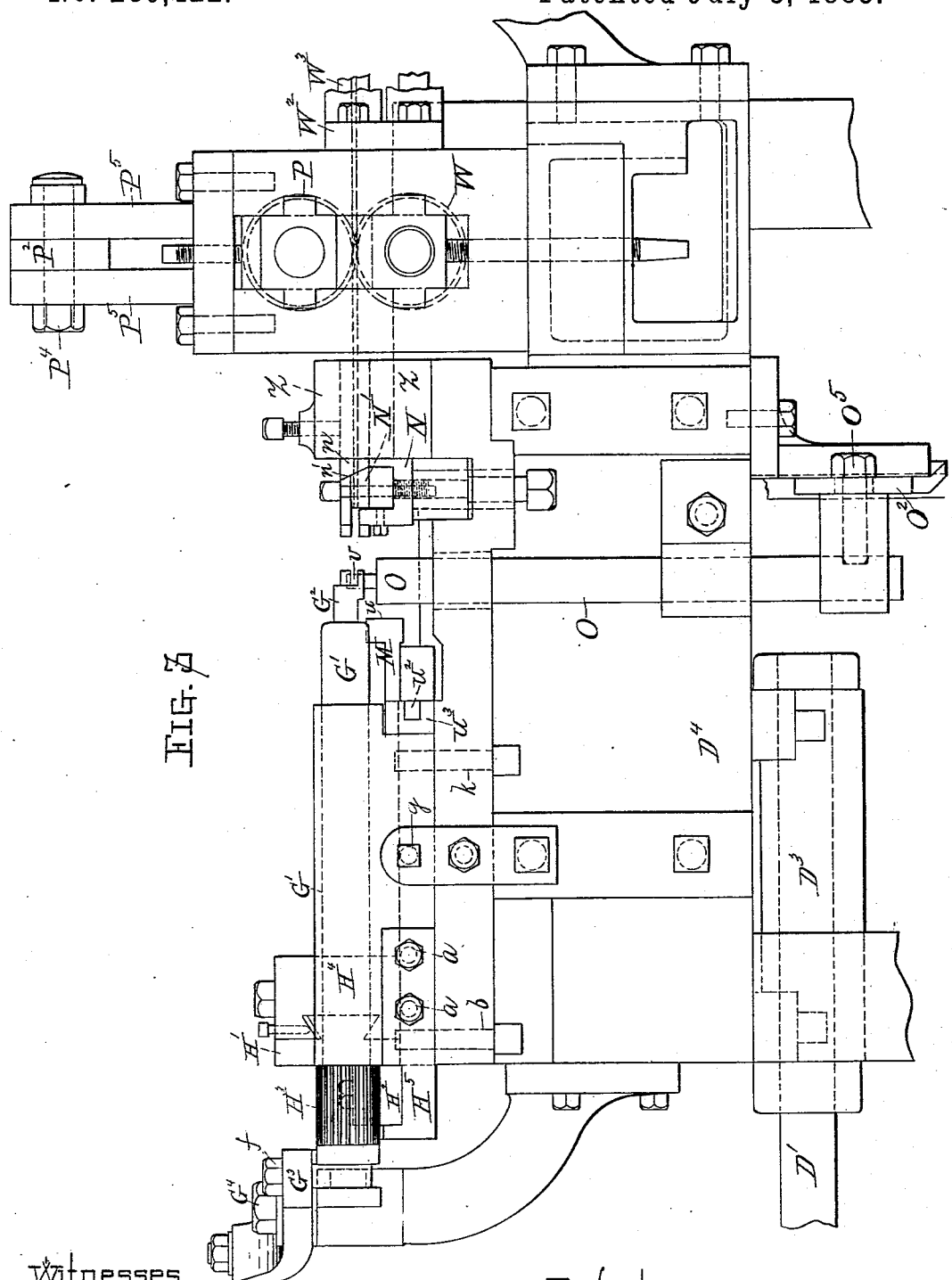

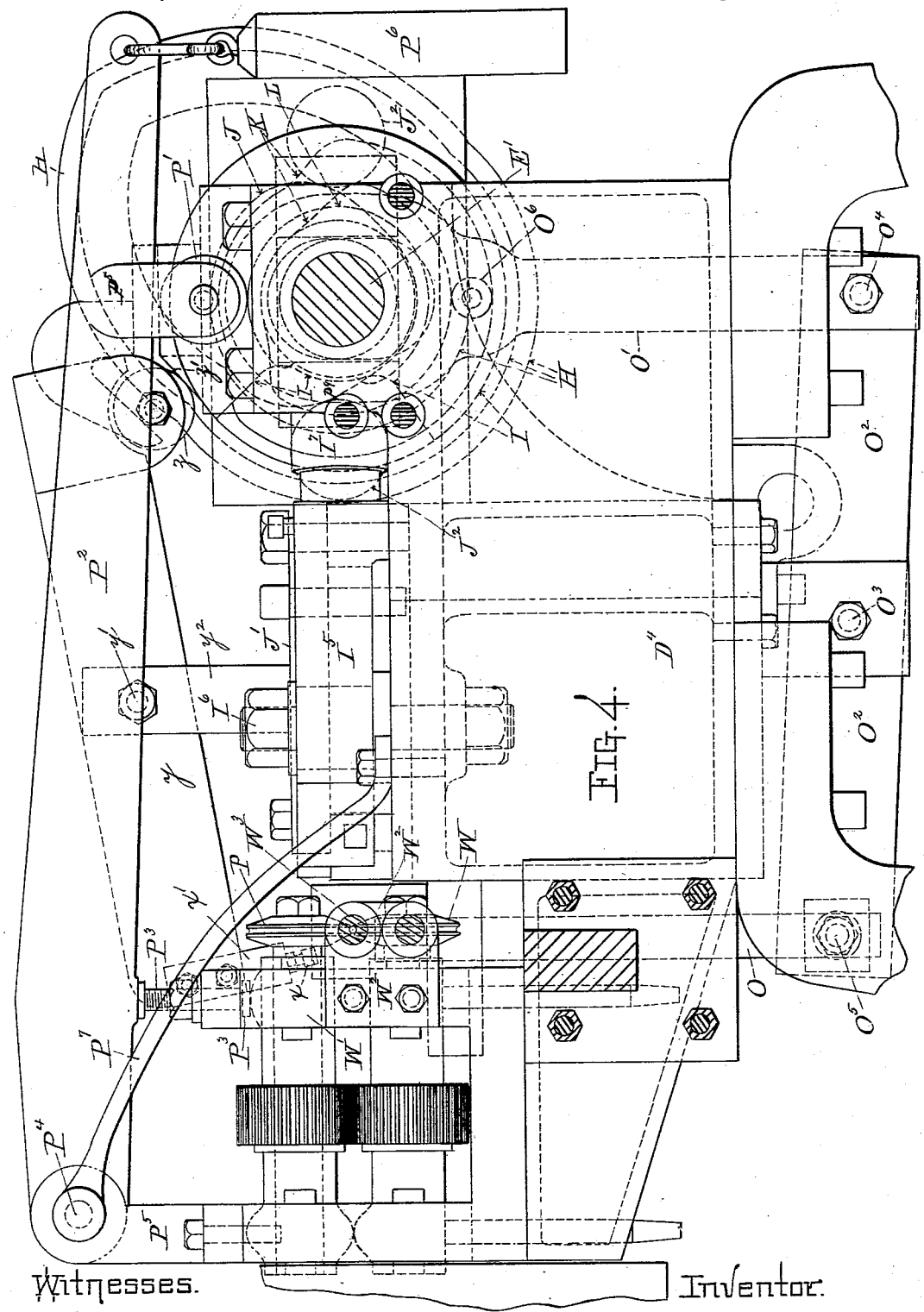

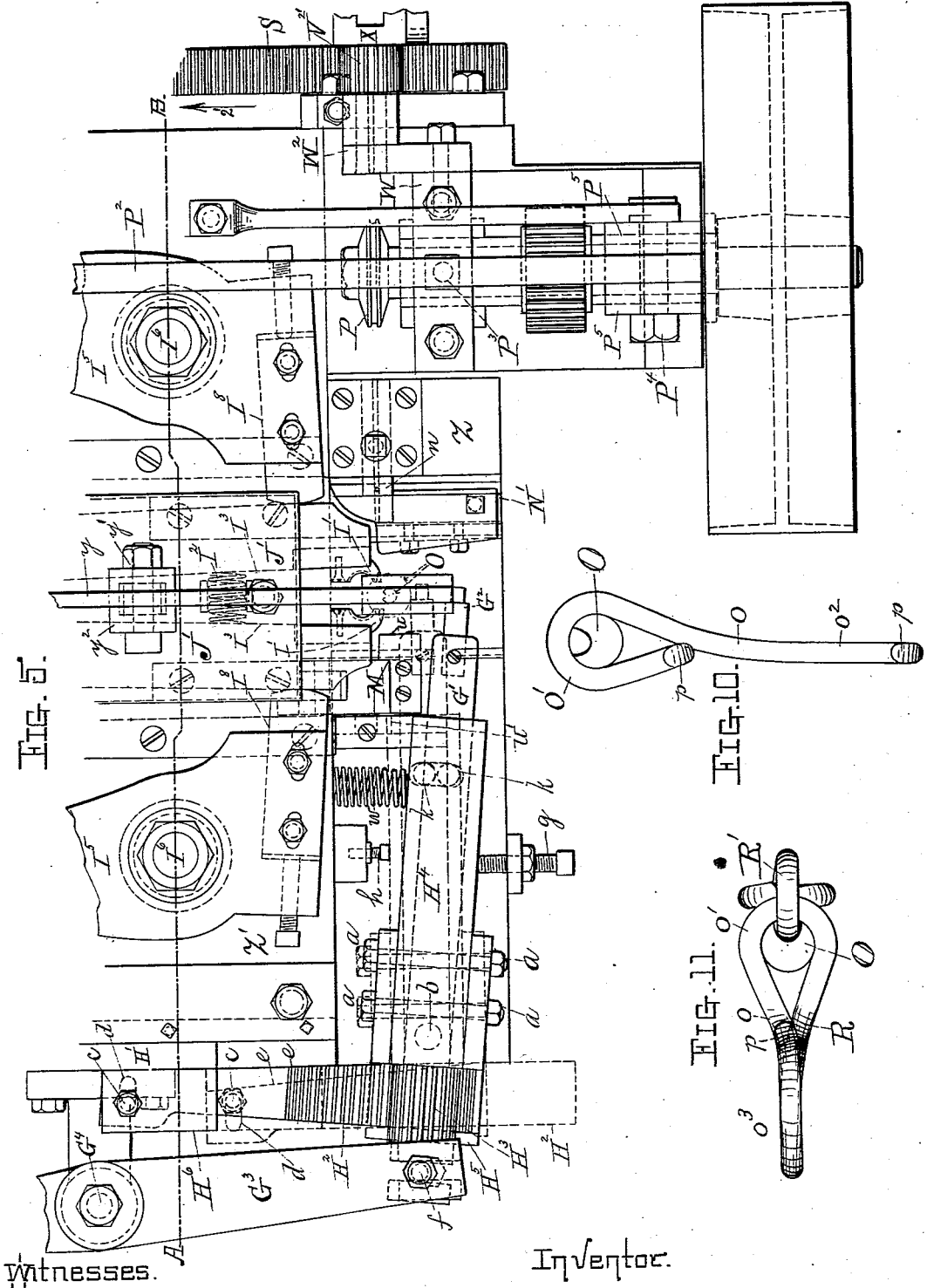

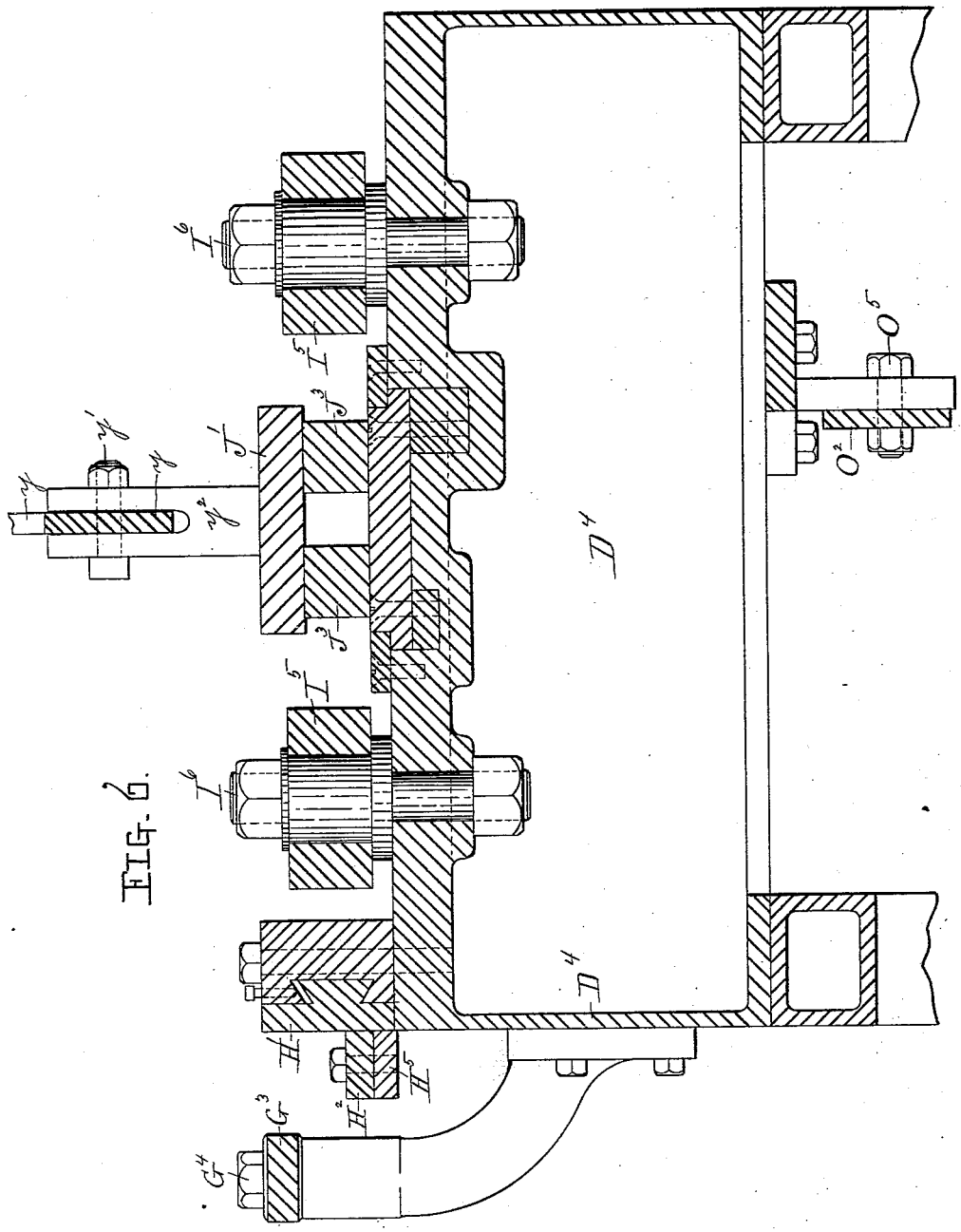

(No Model.) 6 Sheets—Sheet 6.

E. J. WATSON.
MACHINE FOR MAKING PUMP CHAINS.

No. 280,422. Patented July 3, 1883.

Witnesses;
Thos. H. Dodge
John C. Dewey.

Inventor;
Edwin J. Watson

UNITED STATES PATENT OFFICE.

EDWIN J. WATSON, OF WORCESTER, MASSACHUSETTS, ASSIGNOR TO THE WASHBURN & MOEN MANUFACTURING COMPANY, OF SAME PLACE.

MACHINE FOR MAKING PUMP-CHAINS.

SPECIFICATION forming part of Letters Patent No. 280,422, dated July 3, 1883.

Application filed March 24, 1882. (No model.)

*To all whom it may concern:*

Be it known that I, EDWIN J. WATSON, of the city and county of Worcester, and Commonwealth of Massachusetts, have invented certain new and useful Improvements in Machines for Manufacturing Pump-Chains by a Continuous and Automatic Operation; and I do hereby declare that the following is a full, clear, and exact description of the same, reference being had to the accompanying drawings, forming a part of this specification, and in which—

Figure 16:
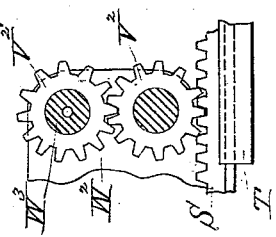
Figure 12:
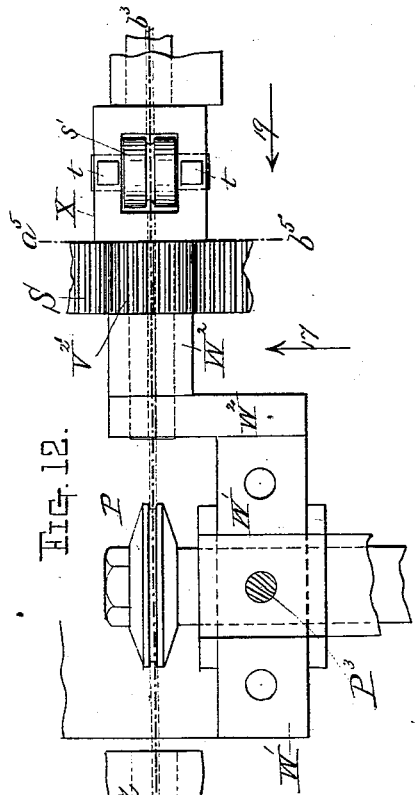
Figure 13:
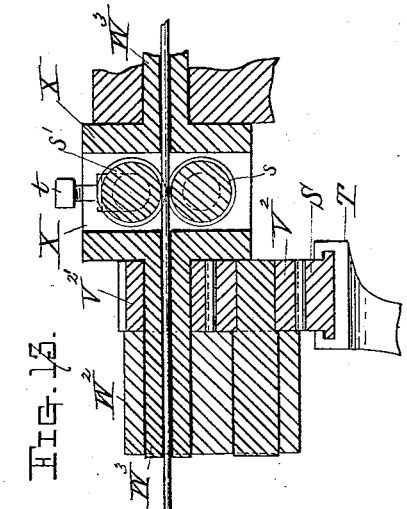
Figure 15:
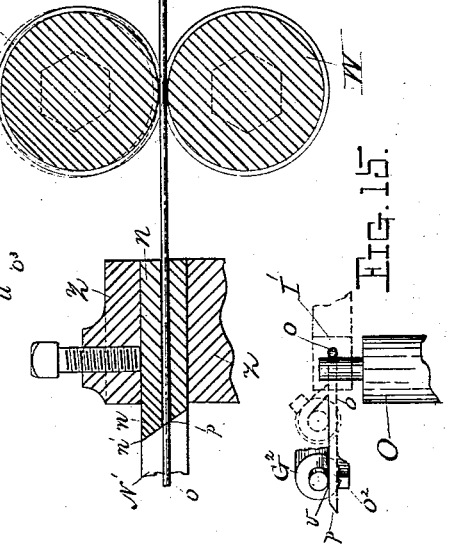
Figure 14:
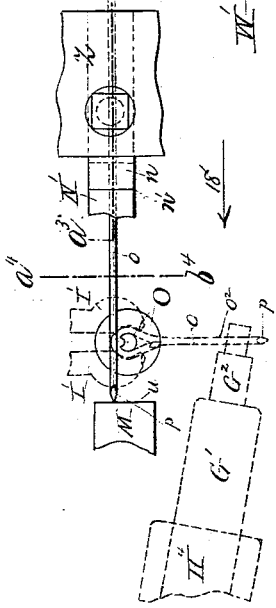

Figure 1 represents a top or plan view of my aforesaid improved pump-chain machine. Fig. 2 represents a vertical section on line E F, Fig. 1, looking in the direction indicated by arrow 1', showing a part of the feed mechanism of the machine, which will hereinafter be more fully described. Fig. 3 represents, upon an enlarged scale, a front or side view of so much of the machine as is necessary to illustrate my aforesaid improvements. Fig. 4 represents, also upon an enlarged scale, a vertical section on line C D, Fig. 1, looking in the direction of arrow 1', same figure, showing an end view of the machine, with the exception of its supporting-legs and one of its driving-pulleys, which are only partly shown. Fig. 5 represents, also upon an enlarged scale, a top or plan view of such portions of the machine as are necessary to illustrate my aforesaid improvements. Fig. 6 represents, upon the same enlarged scale, a vertical section through the parts shown in Fig. 5, taken on line A B of said Fig. 5, looking in the direction indicated by arrow 2'. Figs. 7, 8, and 9 represent, upon the same scale as all the other figures except Figs. 1 and 2, the position and form of the link-sections of wire before and after they have been cut from the main strip and prior to being bent into links, as hereinafter described. Fig. 10 represents a partially-finished link, and Fig. 11 a finished link, (both full size,) the latter showing the previously-formed link in the position that it occupies during the process of manufacturing each succeeding link, as will be hereinafter more fully explained. Fig. 12 represents a plan view of a portion of the machine to more clearly illustrate the wire turning and bending mechanism of the machine, as will be hereinafter more fully described. This figure and all the succeeding ones are upon an enlarged scale. Fig. 13 represents a central vertical section through the parts shown in Fig. 12, taken on line $a^3 b^3$, looking in the direction indicated by arrow 17, same figure. Fig. 14 represents a detached section of the machine, showing the manner in which the finished link is held by the bending or forming jaws, while the next wire section is fed forward through the loop $o^3$, as will be hereinafter described. Fig. 15 represents also a detached section of the machine, showing how the second loop or bend is formed in the link, said section being taken on line $a^4 b^4$, Fig. 12, looking in the direction indicated by arrow 18, same figure; and Fig. 16 represents a vertical section taken on line $a^5 b^5$ of Fig. 12, looking in the direction indicated by arrow 19, same figure.

The nature of my present improvement in chain-pump machines consists in the arrangement of the cutters of the machine so as to cut the ends of the short sections of the wire from which the links are made upon an angle or bevel, in connection with the feed and turning rolls, substantially as and for the purposes hereinafter stated.

To enable those skilled in the art to which my invention belongs to make and use the same, I will proceed to describe it more in detail.

In the drawings, A' represents the main driving-pulley of the machine, and B' a balance-wheel. Pulley A', balance-wheel B', and a small spur-gear under large spur-gear C' are secured upon a horizontal shaft, D', which is fitted to turn in bearing $D^2$, secured to the floor, and a bearing, $D^3$, secured to the under side of the bed $D^4$ of the machine. Driving-power is imparted from pulley A' to the main driving-shaft E' through shaft D', the small spur-gear before alluded to under spur-gear C', and said spur-gear C', which latter is secured to the end of driving-shaft E'. Said driving-shaft E' is fitted to turn in bearings F' F' F' F', which are fastened to the top of bed $D^4$, and upon said shaft are secured cams G, H, I I, J, K, and L. Cam G operates turning spindle G' and its head $G^2$ back and forth longitudinally by means of crank-lever $G^3$, pivoted at $G^4$, which is hinged at one end to the outer end of said spindle G', and provided at its other end with a roll which travels between the surfaces $G^5 G^5$ of said cam G. Cam H is for the purpose of turning spindle G' and its head $G^2$ first in one and then in the opposite direction, as hereinafter described, by means of slide-connection H', toothed rack $H^2$, and pinion $H^3$, the latter being formed or secured upon the outer end of spindle G', between the end of spindle-casing $H^4$ and the inner side of the end of crank-lever $G^3$. Cams I I operate the jaws I' I' in connection with a spiral spring, $I^2$, arranged between the arms $I^3 I^3$ of said jaws. The arms $I^3 I^3$, in the forward ends of which the jaws I' I' are held, are pivoted or hinged at the points $I^4 I^4$, and are sprung apart, so as to open the jaws, by the aforesaid spring $I^2$. The jaws are closed, so as to bend and grip the wire, as hereinafter described, by means of crank-arms $I^5 I^5$, fulcrumed at $I^6 I^6$, one end of said arms being provided with cam-rolls $I^7 I^7$, which travel over and receive the action of the cams, while their opposite ends are provided with adjustable bearing-pieces $I^8 I^8$, which bear upon the outer sides of arms $I^3 I^3$, near their forward ends, as is fully represented in Figs. 1 and 5 of the drawings. Cam J is for operating the sliding frame J' forward and back. This is done by arranging rolls $J^2 J^2$ upon opposite sides of the cam, (upon spindles secured in sliding frame J',) so that they will roll upon its surface, and thus impart a forward and backward movement to said frame when the cam is in operation. Upon sliding frame J' are secured the arms $I^3 I^3$, to which the jaws I' I' are fastened, gage M, for regulating the length of wire to be fed forward to form the link-sections prior to bending, and the movable cutter-block N, which supports and holds the movable cutter N'. Therefore all of aforesaid parts are moved forward and back at the same time by cam J. Cam K operates the link supporting and forming spindle O by means of connecting-arm O' and rocking lever $O^2$, said lever $O^2$ being pivoted at $O^3$ to a bearing secured to bed $D^4$, and hinged to the lower ends of arm O' and spindle O at $O^4$ $O^5$, the upper end of arm O' being provided with a roll, $O^6$, which travels in the track of the cam, thus by rotation of the latter causing the spindle O to move up and down, as hereinafter described. Cam L regulates the pressure required upon the wire in the operation of feeding and stopping the latter to form the links, as hereinafter described.

When pressure is brought to bear upon the bearing of the upper feed-roll, P, the latter is depressed upon the wire, which is fed forward the required distance, (see full lines, Fig. 13;) but such pressure being released, the feed-roll does not bear or press upon the wire, and the feed is stopped, allowing the section of wire to be turned, as hereinafter described. The operation of depressing the feed-roll P is accomplished by means of the following parts: A lever, $P^2$, is pivoted at $P^4$ (see Fig. 4) between upright standards $P^5 P^5$. The part $P^7$ is simply a stiffening-brace to prevent the parts from springing when weight or pressure is thrown upon the pressure-screw $P^3$, as hereinafter described. The part $P^6$ is a weight attached to the end of lever $P^2$. $P^8$ is one of two ears cast or bolted on the sides of lever $P^2$. Between said ears a wheel, P', turns on a pin made fast in the ears $P^8 P^8$.

The part $P^3$ (see Fig. 4) is a pressure-screw screwed into a nut, the pressure to be brought to bear upon the wire being regulated by the length of the screw. The lower end of said screw $P^3$ rests upon the top of the box through which the spindle of the feed-roll P turns, as shown by dotted lines, Fig. 4.

The operation of the above-named parts is as follows: Cam L, (see Fig. 4,) being made fast to shaft E', revolves with it. The wheel P' (the lever $P^2$ being drawn down by the weight $P^6$) rests upon the cam L, and is turned by the revolving cam. When the opening $P^9$ in the cam L comes around, the wheel P' (lever $P^2$ being drawn down by weight $P^6$) drops into the said opening, and by this operation the lever $P^2$ is brought to bear or press upon the top of the screw $P^3$, which causes the screw to press upon the box through which the spindle of the feed-roll P turns, depressing the box and the feed-roll P upon the wire strand, causing the wire to be fed forward. The wheel P', being raised out of the opening $P^9$ in the revolving cam L, raises the lever $P^2$, freeing the screw $P^3$ from pressure, and also the roll P, allowing the wire to remain stationary and to be turned as hereinafter described. The operation of feeding forward is then repeated.

The main object in constructing and arranging the turning spindle G', its head $G^2$, and casing $H^4$ so that they may swing laterally, instead of turning and moving longitudinally in a fixed central line, as formerly, is to produce less wear upon the link-bending head $G^2$. By the old method the head had to be renewed every few hours, while by the present method actual practice has demonstrated the fact that it will last for weeks without renewal.

The old form of machine is modified, and new parts added to the same, so as to admit of the aforesaid lateral swinging motion, as follows: The under side of casing $H^4$ and the way $H^5$ of toothed rack $H^2$ (which is secured to said casing at $a\ a$) are both planed off level upon their under sides, simply resting on the top surface of bed $D^4$, and they are pivoted near the rack to a stationary pivot-bolt, $b$, which extends up through bed $D^4$ and into the under side of casing $H^4$.

In order that the teeth of pinion $H^3$ may properly work in the teeth of the rack when the turning spindle is swung around into different positions in the operation of bending the chain-links R, as hereinafter described, said rack $H^2$ is also arranged to swing, and thereby adapt itself to the motion of the turning spindle, being pivoted at $c$ to the bearing part $H^6$, which is rigidly secured to sliding part H'. A slot, $d$, is formed in the rack $H^2$, and the inner side, e, of said rack cut away, so as to allow of its being swung around by the action of the spindle-casing H⁴ and rackway H⁵. Another slot is also formed in the end of crank-lever G³ for bolt f (which connects said lever with the end of the turning spindle) to work back and forth in.

It will therefore be seen that the addition of my improvements to the turning spindle of the machine does not in the least impair the turning or longitudinal movement of said spindle. The lateral movement of the spindle is governed by means of adjustable gage or stop screws, g h, arranged at each side of the same, and by a bolt, k, extending up through a slot in bed D⁴ and screwed rigidly into the spindle-casing H⁴.

Previous to my invention the sections of wire from which the links are formed have been cut square across by cutters whose abutting surfaces are arranged vertically. By my invention I cut the sections off upon an angle by forming the cutters N' n so that their abutting surfaces will be upon an angle, n', as shown in Figs. 3 and 13. Aside from this change of forming the abutting surfaces of the cutters N' n upon an angle, as described, the cutters, as well as their supporting and holding blocks, and the operation of cutting the sections off, is similar to the old form of pump-chain machines. My object in cutting the ends of the link-sections o upon an angle, as shown at p, Figs. 7 to 12 inclusive, and Figs. 14 and 15 of the drawings, is to obtain a close-fitting joint where the ends are butted or joined together, as shown in Figs. 11 and 14. It will therefore be seen that a very neat and smooth chain is thus produced, which may be employed not only for what are classified as "pump-chains," but for many other purposes where the present rough-surface pump-chains cannot be used. If desired, the ends, when thus cut and joined together, may be easily welded, and by afterward coating the chain with zinc or other metal it may be greatly improved in appearance as well as utility. In order to bring the cut surfaces of the sections o together, as represented in Figs. 11 and 14, the cuts p must be made in opposite directions upon the same side of the wire, as shown in Figs. 9 and 10. To accomplish this the wire is turned one-half of a revolution prior to each section o being cut off, and the wire then turned back into its original position after each cut and prior to the next cut being made. The wire is thus turned in the following manner, (see Figs. 1 and 2 and 12 to 16, inclusive:) A toothed rack, S, is fitted to slide back and forth in a way, T, secured to the side of bed D⁴, and a hub, U, is secured to the end of shaft E' opposite from gear C', which is provided with teeth q for a short distance around the periphery of the same, which work with and turn pinions V V' V'. The number of teeth on hub U is just sufficient to turn pinions V V' V' one-half of a revolution. Therefore for each revolution of hub U the rack S is moved in one direction, and then back again, the rotation of pinion V moving the rack toward the left and the pinions V' V' toward the right, as shown by arrows. Over the opposite end of rack S are arranged two pinions, V² V²', corresponding with pinions V' V', which former are given the same rotary motion by the backward and forward movement of the rack that hub U imparts to said pinions V' V', the lower pinion being at the proper level to work with the rack, and the upper pinion to be operated by the lower one. Pinion V² turns upon a journal secured in a bearing or hanger piece, W², while pinion V²', into which pinion V² meshes, is rigidly secured upon a spindle or journal piece, W³, projecting from one end of the hollow rectangular box X. The center of the upper pinion, V²', is arranged to come upon a level with the center between the peripheries of the two feed-rolls P W, while from the other end of the hollow rectangular box X projects a journal or spindle piece, W³, and upon which journal-pieces W³ W³ the rectangular box X turns when pinion V² is acted upon by sliding rack S for the purpose of turning the wire by means of the turning rolls s s', which are arranged to turn upon suitable journals secured in the sides of rectangular box X. A hole or opening of sufficient size for the passage of the wire o is made through the journal or spindle parts W³ W³, and also through the ends of rectangular box X, all as fully indicated in Fig. 13 of the drawings, while the journal of the upper turning roll, s', has combined therewith adjusting or set screws t t, whereby a greater or less pressure may be produced upon the wire, as desired, in the operation of turning the same. In adjusting the upper turning roll, s', only sufficient pressure is produced upon the wire to insure its turning when block X is turned by pinion V², acting upon pinion V²', and at the same time allow the wire to be readily drawn forward without too much friction.

It will be seen, therefore, from the foregoing description, that each revolution of shaft E' causes the wire to be turned one-half of a revolution, and then back again into its original position, thereby enabling the cuts p on the sections o to be formed as before explained.

As the old portions of the machine are fully illustrated and described in the patent granted to John Adt, August 13, 1878, No. 206,995, a full and detailed description of the same is unnecessary in connection with this case.

Having described my improvements in detail, the operation of the same in connection with said old patented parts of the machine may be briefly summed up thus: The wire is first uncoiled by hand from a spool or reel arranged at a convenient distance to the right of the machine, and is passed between the straightening and guiding rolls Y, thence through block X, between rolls s s', through the upper pinion, V²', journals W³ in bearings W², thence between the feed-rolls P W, into and through stationary cutter n, which is secured in stationary part Z and in front of cutter N" s edge, secured in sliding block N. The machine may now be turned by hand so as to cut the end off to form the cut $p'$ shown in Fig. 7, and to feed the wire forward after such cut is made until it strikes the side $u$ of gage M. Power being now applied to the machine by any suitable means as desired, the wire is then turned one-half of a revolution into the position shown in Figs. 8, 12, and 14, as and for the purpose hereinbefore set forth, when the movable cutter N', then coming forward past the stationary cutter $n$, cuts the link-section $o$ from the main strand, as shown in Figs. 9 and 13. The open jaws, moving forward with the cutter N', now bend forward the link-section $o$ and close against the outer sides of the same after passing the center of spidle O, and form the bend $o'$ in said link-section, as represented in Figs. 10 and 12. The forming and supporting spindle O is moved up into position, as before described, just prior to the link-section $o$ being detached from the main strip, and is dropped down out of the way directly after each link is completed. While the first bend $o'$ is being formed in the link-section $o$ by the jaws, as before described, the turning spindle G' and its slotted head $G^2$ are in the position shown by full lines in Figs. 1, 5, and 15, and dotted lines, Fig. 12, so that when the ends of the link-section $o$ are bent forward the end $o^2$ is thrown into the slot $v$ (see Figs. 3 and 15, full lines, and dotted lines, Fig. 12) of said head $G^2$. Immediately upon said end $o^2$ being inserted in slot $v$ the spindle is made to turn in the manner before described, thereby bending the end $o^2$ of the link-section $o$ over toward the bend or loop $o'$, the spindle being drawn forward by the bending operation into the position shown by dotted lines in Figs. 5 and 15. As soon as the spindle and its head have performed their office they are moved back longitudinally in the manner before described, so as to draw the slotted head $G^2$ out of the way of the link-section, when it is then sprung back into its normal position, ready for the next link, by a spiral or other spring, $w$, arranged between the spindle-casing $H^4$ and the stationary part Z' of the machine. (See Figs. 1 and 5, full lines.)

As will be readily seen, the bend formed by the bending-head $G^2$ does not leave the link in its proper shape, the loop thus formed being bent up higher than required, and the ends not properly brought together to form a good-shaped link. It is therefore necessary to produce a pressure upon the top of said loop, which is done in this instance by means of an adjustable compressing bolt or screw, $x$, which is secured in the part $x'$, (see dotted lines, Fig. 4,) said part $x'$ being in turn secured to the end of a rocking lever, $y$, which is pivoted at $y'$ to a standard, $y^2$, formed or secured upon sliding frame J. Said lever is operated so as to bring its compressing-head $x$ down onto the loop $o^3$ at the proper time to complete the link by a cam-roll, $z$, which is arranged to turn in suitable bearings in its rear end, and which travels over a stationary cam-surface, $z'$, formed or secured on one of the bearings F', said motion being imparted by the forward and backward movement of the sliding frame, to which said lever is pivoted, as before stated.

During the whole of the aforesaid operation, from the time the jaws form the first bend $o'$ until the link is completed, said jaws grip and hold the link-section, and the supporting and forming spindle O remains in an elevated position, as shown in Figs. 14 and 15; but immediately upon the first link being finished, said spindle drops down out of the way, and the jaws, still gripping the finished link, are moved back, as before described, as shown in Fig. 14, and the next link-section is now fed through the bend or loop $o^3$ of the first link, as shown by dotted lines in said Fig. 14, and simultaneously with or directly after said operation the jaws release the finished link, which drops down into the position represented by R', the loop $o^3$ of the finished link resting in the circle or groove of the spindle O, as shown in Fig. 11. The operation of making the next link is then repeated.

Gage M is raised into position for the end of the wire to strike against its side $u$, as before described, just before said wire is fed forward, and dropped down out of the way after the first bend $o'$ is formed in the link by the jaws by a pin, $u$, (see dotted lines, Fig. 5,) formed or secured on the side of the gage, which travels in an inclined groove, $u^2$, (see Fig. 3,) formed in the stationary part $u^3$, said gage M being moved back and forth with the sliding frame and other parts connected thereto, as before stated, and thereby causing the pin $u'$ to travel up and down in its inclined groove.

It will therefore be seen from the foregoing description of the construction and operation of the spindle G' that but little friction is produced upon the bending-head $G^2$ of said spindle by the wire in the operation of forming the bend in the end $o^2$, owing to said spindle and head adapting themselves to the motion of the wire in said bending operation, whereas by the old method of having a stationary spindle-casing, $H^4$, the wire must necessarily slip on the head $G^2$ in the operation of bending, which wears away said head very rapidly.

Having described my improvements in machines for manufacturing pump-chains, what I claim therein as new and of my invention, and desire to secure by Letters Patent, is—

The combination, in an automatic pump-chain machine, with intermittent feed-rolls P W and turning rolls $s\ s'$, of beveled cutters N' $n$, substantially as and for the purposes set forth.

EDWIN J. WATSON.

Witnesses:
   THOS. H. DODGE,
   JOHN C. DEWEY.